Figure 6:
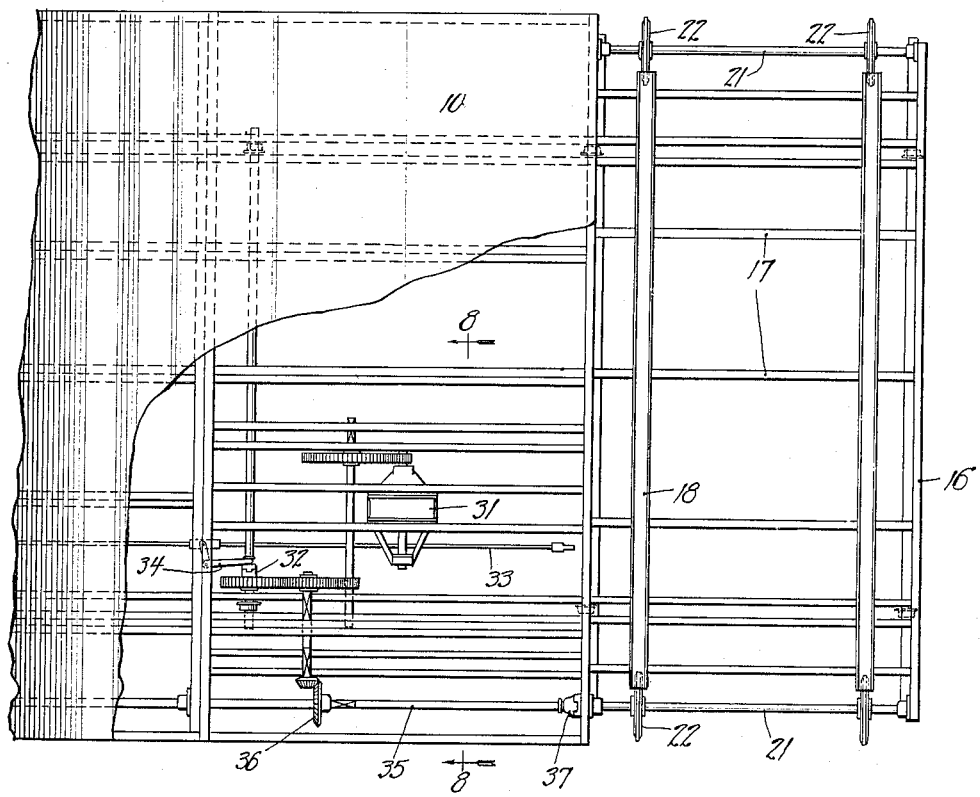

March 11, 1924.
A. N. BECKER
1,486,275
STORAGE AND HANDLING OF MOTOR VEHICLES
Filed May 23, 1921
4 Sheets-Sheet 1
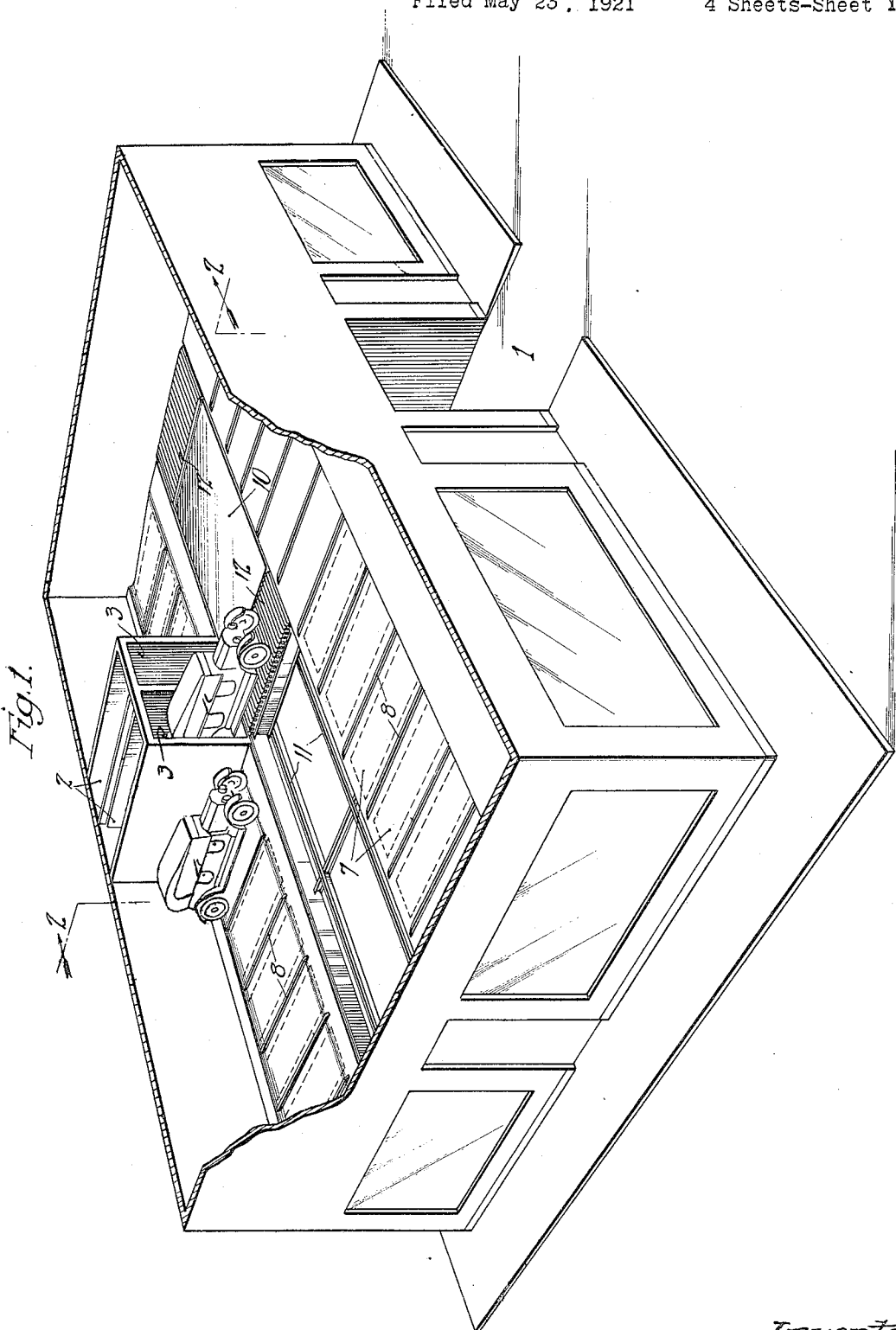
Inventor.
Alfonse N. Becker.
By: Offield Poole & Hinton
Attys March 11, 1924.    1,486,275
A. N. BECKER
STORAGE AND HANDLING OF MOTOR VEHICLES
Filed May 23, 1921    4 Sheets-Sheet 2
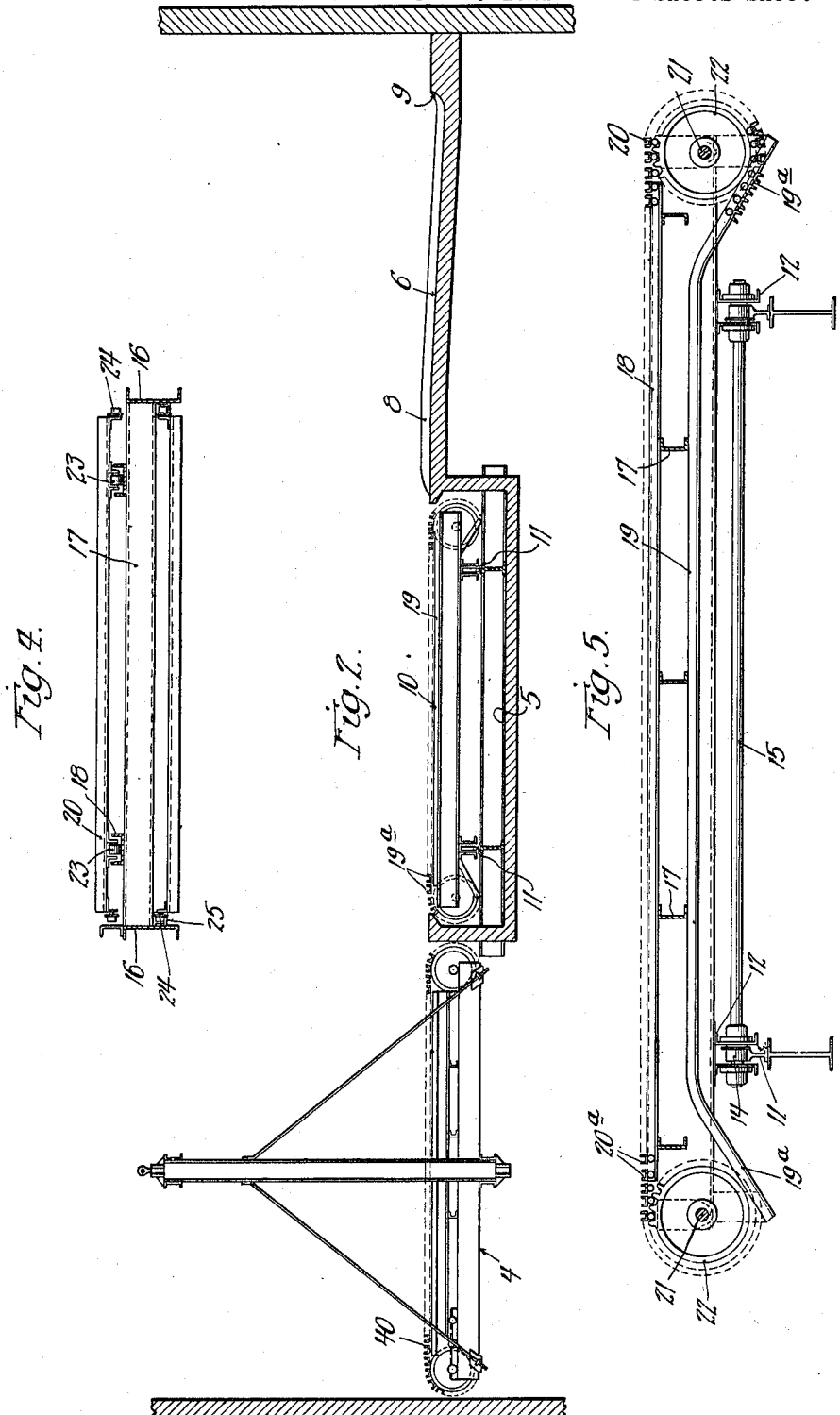
Inventor:
Alfonse N. Becker.
By: Offield, Poole & Huston
Attys.

March 11, 1924. 1,486,275
A. N. BECKER
STORAGE AND HANDLING OF MOTOR VEHICLES
Filed May 23, 1921 4 Sheets-Sheet 3
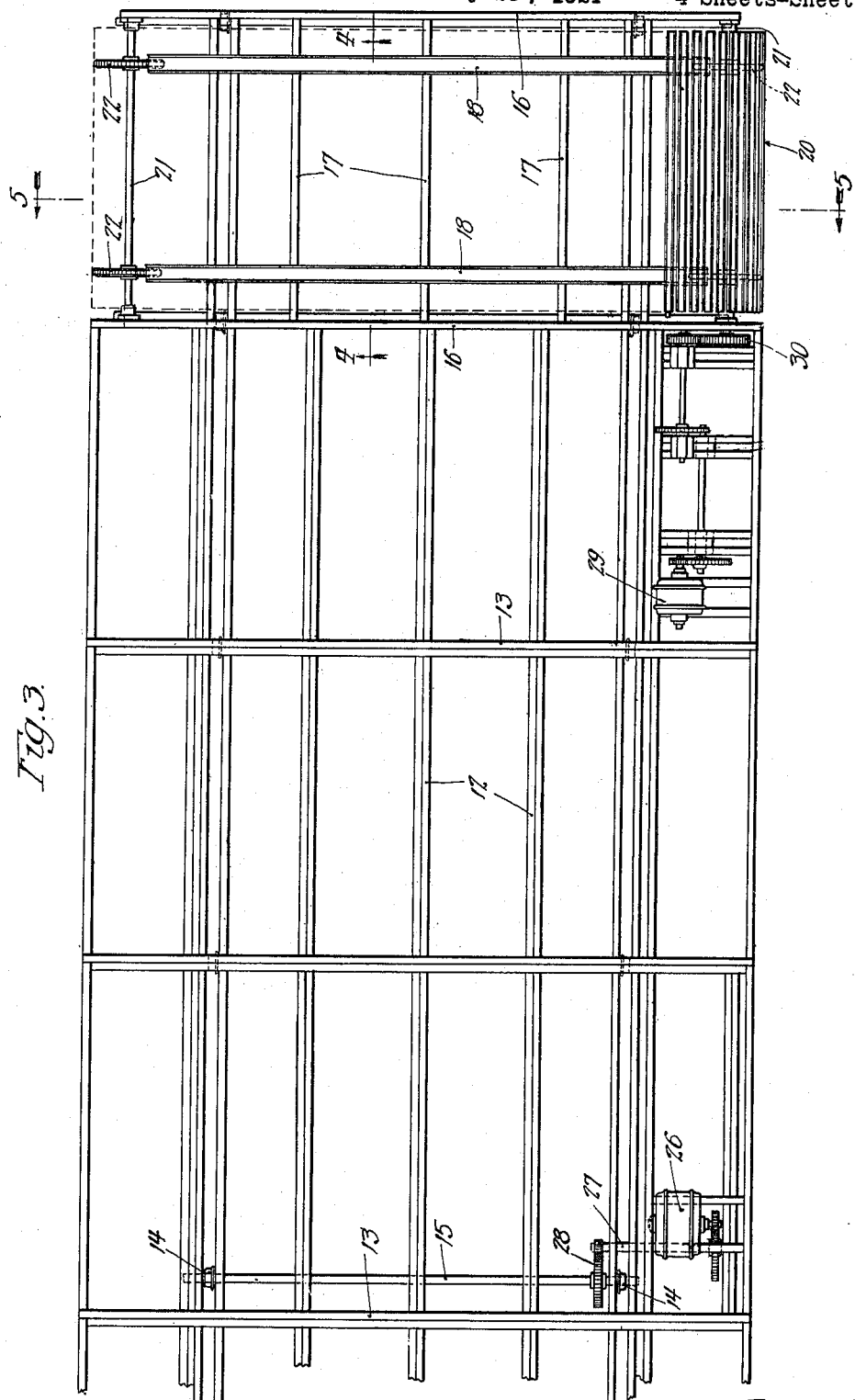
Inventor:
Alfonse N. Becker.
By: Offield, Poole & Hueton
Attys.

Patented Mar. 11, 1924.

1,486,275

UNITED STATES PATENT OFFICE.

ALFONSE N. BECKER, OF CHICAGO, ILLINOIS, ASSIGNOR TO ALFONSE N. BECKER, CHARLES T. JACOBS, AND ERNEST V. LUNDGREN, TRUSTEES, OF AUTOMATIC GARAGE SYSTEMS, A TRUST.

STORAGE AND HANDLING OF MOTOR VEHICLES.

Application filed May 23, 1921. Serial No. 471,608.

*To all whom it may concern:*

Be it known that I, ALFONSE N. BECKER, a citizen of the United States, and a resident of Chicago, in the county of Cook and State of Illinois, have invented certain new and useful Improvements in Storage and Handling of Motor Vehicles, of which the following is a specification.

This invention relates to improvements in the storage and handling of motor vehicles, and more particularly to apparatus for the purpose indicated as applied to a building devoted to the storing and housing of vehicles and the like.

The object of the invention is to provide suitable apparatus to be installed in a building whereby the vehicles may be transported and moved from place to place within the building by power other than that of the vehicle itself, and whereby such vehicles can be handled with promptness and dispatch and without confusion.

A further object of the invention is to provide a system for vehicle storage in which the floor area is more completely utilized for storage purposes and eliminating the space usually required for turning and backing the vehicles upon the storage floor by providing a traveling platform or table for moving the vehicle bodily from the receiving entrance to its parking or storage space, and similarly in its exit from its storage space to the discharge entrance.

In the preferred embodiment of the invention a plurality of floors is contemplated, thus involving the use of an elevator, although for the purpose of the invention, each floor may be considered a separate unit of the complete storage system.

In the drawings, which fully illustrate a building or garage devoted to the storage and handling of motor vehicles, Fig. 1 is a perspective view of the ground and second floors of a building, showing the arrangement of the transfer table.

Figure 7:
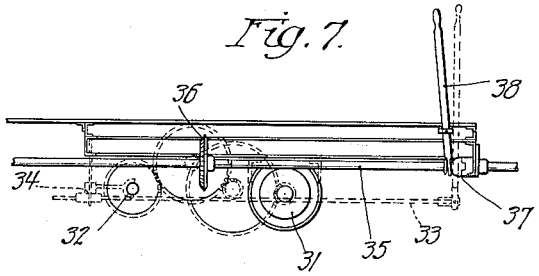
Figure 8:
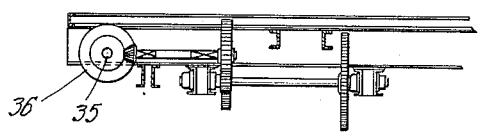

Fig. 2 is a cross-sectional view taken on line 2, 2 of Fig. 1, and including a single floor and handling apparatus associated therewith, Fig. 3 is a top plan view of the transfer table, partially in skeleton form, to show the structure, Fig. 4 is a detail view in transverse section of one of the conveyors of the transfer table, taken on line 4, 4 of Fig. 3, Fig. 5 is a view in horizontal section of a conveyor of the transfer table, taken on line 5, 5 of Fig. 3, Fig. 6 is a fragmentary top plan view of a modified form of transfer table, shown partially in skeleton, Fig. 7 is a detail view in side elevation of the transfer table shown in Fig. 6, and Fig. 8 is a detail view in transverse section, taken on line 8, 8 of Fig. 6.

The building or garage may be of any suitable construction or design, such as the rectangular structure shown in Fig. 1, consisting of a ground floor, preferably devoted to other purposes than storage, and having a front entrance drive 1 from the street. At the rear of the ground floor and opposite the entrance are two elevator shafts 2, 2 arranged side by side and extending throughout the height of the building devoted to vehicle storage. Each elevator shaft has an entrance 3 to the upper floor, as shown, or if desired, the elevator shafts may be located centrally of the building and provided with entrances at opposite sides of the shaft, permitting vehicles to be discharged from or to be placed on the elevators from either side. Elevators are mounted in the shafts 2, 2, the same being driven by any suitable form of power.

A section through the building (Fig. 2) discloses a typical arrangement for handling vehicles, the elevator shafts and elevators being adjacent the rear wall 5 of the building, the entrance 3 opening forwardly and immediately onto a depression or trough 5 extending longitudinally of the building and transversely of the elevator entrances 3, 3. Immediately beyond the trough 5 is a parking or storage space 6, extending parallel with said trough, the same being utilized for the vehicle storage, and preferably divided into parking spaces or stalls 7, extending throughout the length of the floor space 6. These parking spaces are preferably divided from each other by means of rails 8 elevated from the floor level a sufficient height to serve as partition members. Furthermore, the parking area is inclined slightly from front to rear, as shown in Fig. 2, and the rear end of the same is provided with a shoulder 9 acting as a stop for the vehicles as they are delivered into the stalls from the transfer table and impelled partially by the inclination of the floor into final position.

Within the trough or longitudinal depression 5 is a traveling platform or transfer table 10 consisting of an elongated carriage supported on tracks 11, 11 extending the length of the storage floor. The surface of said platform or table is substantially flush with the floor level and virtually forms a movable section thereof. The dimensions of the transfer table are based upon the length of the floor area and the length of the vehicles, that is to say, the length of the transfer table is equal to one-half the length of the floor space so that in moving from one end of the floor to the other, it travels one-half the distance or substantially its own length. Its width is obviously such as to accommodate the standard length vehicle, positioned transversely thereon. At each end of the transfer table are conveyors 12, 12 comprising an endless traveling surface arranged transversely of the table and to the direction of travel thereof. The surface between the conveyors is stationary and as will be presently seen, is available for storage space in case the parking spaces 7 are completely filled.

As before suggested, the transfer table is in the nature of a carriage built upon a skeleton framework of structural steel and consisting in the main of longitudinal and transverse beams 12 and 13, respectively. The carriage is mounted on pairs of rollers or wheels 14 fixed to axles 15 extending transversely of the frame and journalled in suitable bearings. The portion of the transfer table intermediate the conveyors is decked over with a flooring forming the storage platform before mentioned. The end or conveyor portions of the transfer table frame differ somewhat in construction to provide for the support of the endless tread surfaces thereof. As clearly shown in Figs. 3, 4 and 5, two transverse channel beams 16 form the lateral members of the conveyors, there being a series of cross-beams 17 extending between them, the latter in turn supporting two pairs of channel shaped guide members 18, 18 and 19, 19, one pair facing upwardly and the other pair downwardly. These members extend longitudinally of the conveyor and serve as guides for the endless tread member 20, preferably consisting of a plurality of channel bars 20$^a$ linked together with their webs or flanged portions projecting outwardly, thereby providing a ribbed or corrugated surface, such as would tend to reduce the rolling tendency of the vehicles over the tread surface. At either end of the conveyor are journalled shafts 21, 21 which carry pairs of sprocket wheels 22—22 meshing with a series of rollers 23 mounted on the under surface of the tread surface, and also adapted to bear against and engage the channel shaped guide members 18 and 19. As clearly shown in Fig. 5, the lower guide members 19, 19 are spaced a short distance from the uppermost guide members 18, 18 intermediate their ends, being inclined downwardly at their end portions 19$^a$. In this manner the return lead of the tread is carried or guided upwardly above the plane of the tracks 11, 11. As a further means for supporting and guiding the endless tread, rollers 24 are mounted at the ends of the bars 20$^a$ thereof, these rollers engaging angle bars 25 secured to the inner faces of the side frame members 16, 16 (Fig. 4).

As clearly shown in Fig. 3, driving mechanism is carried on the transfer table for moving the same along the track, as well as for operating the endless tread of the conveyors 12, 12. As a suitable arrangement separate driving units are employed. An electric motor 26, hung from the frame members of the transfer table, is connected with one of the axles 15 through a suitable system of reduction gearing including a counter shaft 27 and a train of gears comprising a gear wheel 28 mounted on the axle. By means of a controller the transfer table may be operated along the tracks. By a similar arrangement a motor 29 is hung from the frame members adjacent the ends of the transfer table, and by means of a similar system of reducing gears and shafting, is connected to the sprocket shaft 21 at the adjacent end, the same being provided with a driving gear wheel 30 with which the gear train is connected. The motor and hence the conveyor is operated by a controller handled by an attendant, as will presently be described.

If desired, however, the transfer table as well as the conveyors may be driven from a single motor 31 mounted at a suitable point intermediate the ends of the table (Figs. 6, 7 and 8) the same being connected through a system of reduction gears and shafting as before, to the axle 15, this connection however including a clutch 32 connected with a shift rod 33 and operating lever by means of a bell crank lever 34. In this manner the movement of the transfer table may be controlled. Through the same system of gearing the power is transmitted to a shaft 35, through bevel gearing at 36, said shaft extending the length of the transfer table and connected with the sprocket shafts 21, through an intermediate clutch lever 38 (Fig. 7) to start and stop the conveyor. A motor controller is also employed for reversing the direction of the transfer table, as well as that of the conveyors 12, 12.

A similar construction is employed in the elevator 4 as described in connection with the conveyors 12, 12, namely that of an endless tread 40 of the same construction carried on sprocket wheels 41, 41 mounted at either end of the elevator platform.

The operation of the handling apparatus and the method in which the vehicles are placed in and delivered from storage will be understood from the following. A vehicle would be driven onto the elevator at the ground level and its power shut off. The elevator would then be elevated to the storage floor, and arriving there, the transfer table would be moved so that the conveyor 12 at one end or the other would be placed opposite the elevator entrance. If the vehicle is to be stored at the left of the elevator shaft (Fig. 1) the conveyor at the left of the transfer table would be employed. To discharge the vehicle from the elevator onto the conveyor the tread of the elevator would be started, thus moving the car onto the conveyor, it being unnecessary during this operation to operate the conveyor. The transfer table is then moved to the left, until the vehicle is opposite its assigned parking space 7, and brought to a stop, whereupon the conveyor is set in motion and the vehicle is discharged into its space, this movement from the transfer table being facilitated by the inclination of the floor of the space 7.

If the vehicle, however, is to be stored on the right of the elevator shaft, the conveyor at the right end of the transfer table would be used and the same operations repeated. This mode of handling is self evident from the fact that the travel of the transfer table only permits the conveyor to operate from the elevator shafts to adjacent ends of the storage floor.

To deliver a vehicle from the storage space to the elevator, the same operations are accomplished in reverse order, except in moving the vehicle onto the conveyor. For this purpose a cable is attached at one end to the vehicle and at the other end to the endless tread in any suitable manner and the latter started, thereby pulling the vehicle onto the conveyor. The delivery of the vehicle onto the elevator is accomplished by operating the conveyor in the opposite direction.

By the use of two elevator shafts and two conveyors the handling and storage of vehicles may be carried on rapidly and systematically and with the minimum number of attendants, there being only necessary an elevator attendant, an attendant on each floor to operate the transfer table and conveyors, and an operator who accompanies the vehicle to and from its parking or storage space.

In the event that all the spaces on the parking floor are occupied, the transfer table offers additional parking space. In this instance the vehicles are delivered directly from the elevator onto the designated space on the transfer table, and vice versa. In every case the movement of the vehicle is accomplished by power other than that of the vehicle and in the movement the turning and backing of the vehicles on the storage floor is entirely eliminated.

Manifestly a storage system such as herein disclosed admits of numerous modifications in the arrangement of the elevator shafts, the length of the transfer table, and the disposition of the parking spaces. For instance, the transfer table 10 instead of being exactly one-half the length of its track, and the elevators located at the center of the track, as shown in Figure 1, the table may be slightly shorter, so that either or both end loading portions or conveyor 12 may register with either or both elevators. Obviously, a single elevator may be used, in which case it would be preferably located at the center of the storage space for the reason that the maximum length of transfer table may be used, and hence the greater area of storage space between the end loading conveyors. The use of two or more elevators increases the capacity of handling vehicles, and although the length of the transfer table may still be one-half the length of the storage space, it would materially facilitate the handling if the transfer table were reduced in length sufficiently to permit either end loading space to register with any one of the elevators. This permits the vehicles to be loaded or unloaded from either end of the transfer table to one or any number of elevators.

For these reasons and others it is not desired to limit the invention to any particular arrangement or plan of structure, nor to any particular detail of construction or operation of the handling apparatus, nor to the handling of vehicles only except in so far as the structure and its function come within the scope of the appended claims.

I claim as my invention:

1. In a garage construction, the combination with two separated rows of individual parking spaces, of a transfer table positioned in the aisle between said rows and adapted to move lengthwise thereof, means arranged transversely to the aisle and between certain of the parking spaces for giving access to the table, and two loading spaces on said table either of which is adapted to move into alignment either with said means or with any one of a plurality of the parking spaces.

2. In a garage construction, the combination with two separated rows of individual parking spaces, of a transfer table positioned in the aisle between said rows and adapted to move lengthwise thereof, a passage into the aisle through one of said rows, a loading space on said table adapted to move into alignment either with the passage or with any one of a plurality of the parking spaces, and another loading space on said table adapted to move into alignment either with the passage or with any one of a plurality of different parking spaces.

3. In a garage construction, the combination with two separated rows of individual parking spaces, of a transfer table positioned in the aisle between said rows and adapted to move lengthwise thereof, a passage into the aisle through one of said rows, a loading space on said table adapted to move into alignment either with the passage or with any one of a plurality of the parking spaces, another loading space on said table adapted to move into alignment either with the passage or with any one of a plurality of different parking spaces, and an additional individual parking space located on the table between the loading spaces and adapted to move into alignment with the passage.

4. In a garage construction, the combination with two separated rows of individual parking spaces, of a transfer table positioned in the aisle between said rows and adapted to move lengthwise thereof, a passage into the aisle through one of said rows, a loading space located on said table at one end thereof and adapted to move into alignment either with the passage or with any one of a plurality of the parking spaces, another loading space located on said table at the other end thereof and adapted to move into alignment either with the passage or with any one of a plurality of different parking spaces, and additional individual parking spaces located on the table between the loading spaces and adapted to move into alignment with the passage.

5. In a garage construction, the combination of a parking area adapted to provide a plurality of individual parking spaces, a transfer table movable transversely of said parking spaces, means for delivering to and from said transfer table, said table having a loading space at either end adapted to register with said delivery means.

6. In a garage construction, the combination of a parking space providing a plurality of individual parking spaces, a transfer table movable transversely of said parking spaces, delivering means communicating with said transfer table, said table being provided with loading spaces at the ends thereof, adapted in its movement to register with said delivering means and with certain of said parking spaces, and a storage space between said loading spaces.

7. In a building for the purpose described, the combination of a storage area having a delivery entrance intermediate two sides thereof, a trackway extending between said ends and immediately adjacent said entrance, a transfer table travelling on said trackway and provided with conveyors at the ends thereof, each adapted to receive and discharge vehicles at said entrance and to receive and discharge the same at predetermined points along said trackway.

8. In a building for the purpose described, the combination with a storage floor having a receiving and delivery entrance, of a transfer table movable in a path transverse to said entrance and provided at its ends with conveyors comprising endless traveling tread surfaces, and an intermediate storage space.

9. In a building for the purpose described, the combination of a storage area having a delivery entrance intermediate the ends thereof, a depressed trackway extending lengthwise of said area and adjacent said entrance, a traveling transfer table on said track-way having a length substantially one-half the length of said track-way, and having endless traveling tread surfaces at its ends adapted to register with said entrance.

10. In a building for the purpose described, the combination of a storage area having a delivery entrance intermediate the ends thereof, a transfer table adapted to travel the length of said area and having a length not greater than one-half the length of its path of travel, and conveyors at the ends of said transfer table, and an intermediate storage space.

11. In a building for the purpose described, the combination of a storage floor, an elevator shaft having an entrance on said floor, an elevator in said shaft, a transfer table movable endwise in front of said elevator entrance and having conveyors at the ends thereof, each adapted to register with said elevator entrance, said elevator being also provided with a conveyor adapted to co-operate with either conveyor of said transfer table to impel a vehicle from or to said elevator to or from said transfer table.

12. In a garage construction, the combination with two separated rows of individual parking spaces, of a transfer table positioned in the aisle between said rows and adapted to move lengthwise thereof, means arranged transversely to the aisle for giving access to the table, and two loading spaces on said table either of which is adapted to move into alignment either with said means or with any one of a plurality of the parking spaces.

13. In a storage construction, the combination with two separated strips of storage area, of a transfer table positioned in the aisle between said strips and adapted to transfer articles to or from any portions of said strips, and storage area covering a substantial portion of said table but presenting even when occupied with articles in storage no obstacle to the functioning of the transfer table as such.

In witness whereof, I hereunto subscribe my name this 18th day of May, A. D. 1921.

ALFONSE N. BECKER.